United States Patent [19]
Nishikawa et al.

[11] 3,987,463
[45] Oct. 19, 1976

[54] AUTOMATIC EXPOSURE CONTROL CIRCUIT FOR PHOTOMICROGRAPHIC APPARATUS

[75] Inventors: Masaji Nishikawa; Asao Hayashi, both of Hachioji; Tadashi Morokuma, Tokyo; Kensaku Miyazaki, Machida, all of Japan

[73] Assignee: Olympus Optical Co., Ltd., Tokyo, Japan

[22] Filed: Sept. 3, 1974

[21] Appl. No.: 502,755

[52] U.S. Cl. .................................. 354/50; 354/51; 354/60 R; 354/60 L; 354/79; 354/173
[51] Int. Cl.² ..................... G03B 7/08; G03B 29/00; G03B 19/10
[58] Field of Search ............... 354/48, 50, 51, 60 R, 354/60 L, 60 E, 79, 173, 230, 231, 232, 233, 234; 355/38

[56] References Cited
UNITED STATES PATENTS

| | | | |
|---|---|---|---|
| 3,581,634 | 6/1971 | Ort | 354/60 L |
| 3,596,580 | 8/1971 | Rentschler | 354/51 |
| 3,625,127 | 12/1971 | Tsuda | 354/234 |
| 3,763,755 | 10/1973 | Kuramoto et al. | 354/173 |
| 3,778,150 | 12/1973 | Aston | 355/38 |
| 3,798,663 | 3/1974 | Wagensonner et al. | 354/51 |

Primary Examiner—Russell E. Adams, Jr.
Attorney, Agent, or Firm—Ostrolenk, Faber, Gerb & Soffen

[57] ABSTRACT

An automatic exposure control circuit comprises a pair of lamp circuits for displaying the fact that an automatic exposure is feasible and the exposure period which is automatically determined, as well as an electronic shutter circuit and an automatic shutter release circuit, and optionally a color temperature measuring circuit. The control circuit is associated with a photomicrographic apparatus which takes a picture of a specimen being observed in a microscope. When taking a picture, a photometry is made of light from a specimen being photographed in order to determine initially whether an automatic exposure control is feasible for the specimen, and if it is feasible, to provide an automatic release of an electronic shutter by means of a motor, thereby activating the electronic shutter and also producing a lamp display during the period when the electronic shutter is operating. Optionally, a color temperature of the light from a light source which is used to irradiate the specimen is measured.

11 Claims, 4 Drawing Figures

AUTOMATIC EXPOSURE CONTROL CIRCUIT FOR PHOTOMICROGRAPHIC APPARATUS

BACKGROUND OF THE INVENTION

The invention relates to an automatic exposure control circuit for photomicrographic apparatus.

When observing a specimen on a microscope, it is often desirable to take a picture of the specimen being observed at any desired time, which can be effected by means of a photomicrographic apparatus, i.e. a microscope with photographic apparatus. An automatic exposure control circuit for such apparatus is responsive to a light from the specimen, which light is split into an observation optical system and a photographic optical system by means of a path splitting prism. The light in the photographic optical system is introduced into the photographic apparatus, and is further split by another path splitting prism into a viewer path and an exposure path also. The light in the latter path impinges upon a photoelectric transducer element contained in the automatic exposure control circuit. After a shutter is released, the automatic exposure control circuit operates to provide a porper exposure to a photosensitive film.

The automatic exposure control circuit of the kind described essentially comprises an electronic shutter circuit. Unlike a conventional photographic camera, the photographic apparatus associated with a microscope is not provided with an exposure diaphragm, so that the only exposure controlling factors are film speed and shutter speed. Because of the relationship between the brightness of a light source and that of an object being photographed, the shutter speed in an automatic exposure operation is limited to a speed value corresponding to an exposure period less than 1/100 second, and a higher shutter speed in excess of 1/100 second can not be used because of the above relationship and the restrictions imposed by a shutter mechanism. In view of this, it is desirable in the photographic apparatus associated with a microscope that for a relatively long exposure period in excess of 1/100 second in an automatic exposure operation, some means be used to display that the electronic shutter is in operation. In a conventional apparatus, the electronic shutter circuit is utilized for this purpose to illuminate a lamp while the electronic shutter is in operation, thus indicating that the specimen is being photographed.

However, before the electronic shuter is operated, it is necessary to determine whether the automatic exposure is feasible for a specimen being photographed. If a favorable exposure condition prevails between the brightness of the specimen being photographed and that of the light source, the electronic shutter will be operated with a shutter speed less than 1/100 second, initiating an automatic exposure to assure a satisfactory photograph. If an automatic exposure is attempted without regard to the above mentioned relationship, a good picture can not be taken. In particular when taking a color picture, the color temperature of the light from the light source which irradiates the object being photographed, namely, the specimen, is also involved. Thus, in order to assure an optimum exposure in an automatic manner by the operation of the automatic exposure control circuit, there is a need to display by some means whether or not an automatic exposure is possible for a particular specimen being photographed, before the shutter is released.

When releasing a shutter, a manual operation of the release member may inadvertently shift the body of the microscope. As an alternative, the use of an electromagnetic plunger is contemplated to urge the release member, but as is well known, the force from the electromagnetic plunger increases in an accelerated manner, so that the release may result in applying oscillations to the body of the microscope. Therefore, it is essential that the release member be operated in a quiet and smooth manner by remote controlling means.

SUMMARY OF THE INVENTION

It is an object of the invention to provide an automatic expsoure control circuit for a photomicrographic apparatus in which when taking a picture of a specimen being observed on a microscope, a photometry of the light from the specimen, which is irradiated by light from a light source, is made by means of a photoelectric transducer element, which represents the light receiving element in the electronic shutter circuit, and a switching circuit including a field effect transistor (hereafter FET), to determine automatically whether or not an automatic exposure control is feasible for the specimen, and if feasible, to display to this effect with a lamp, and upon release of the shutter, a switch is operated in synchronism with the opening movement of the shutter so that the photoelectric transducer element and the switching circuit form an electronic shutter circuit, and the period during which the electronic shutter is in operation is indicated by another lamp.

It is another object of the invention to provide an automatic exposure control circuit for a photomicrographic apparatus in which the release member of the electronic shutter is driven by means of a remotely controlled motor and a single revolution mechanism which is operated by the moto, and in which a switch is operated in synchronism with the opening movement of the shutter to cause an electronic shutter circuit to be formed.

It is a further object of the invention to provide an automatic exposure control circuit for a photomicrographic apparatus including an electrical circuit which measures the color temperature of the light which irradiates a specimen being photogtaphed.

In accordance with the invention, a lamp display is provided of whether or not an automatic exposure control is feasible, thereby avoiding a failure in taking a picture in a photomicrographic apparatus. The display lamp circuit comprises the photoelectric transducer element and the switching circuit, both of which are included in the electronic shutter circuit, thus avoiding further complication in an electrical circuit arrangement and increased cost. The lamp circuit which displays the feasibility of an automatic exposure and another lamp circuit whch displays that the electronic shutter circuit and the electronic shutter are in operation are alternately operated by means of a switch, thereby facilitating the recognition of which lamp is being illuminated.

The electronic shutter is adapted to be released by a rotative force from a remotely controlled motor, thus avoiding oscillations imparted to the microscope upon release and also assuring a smooth photographing operation. An electronic circuit including a differentiator circuit and a thyristor is used to control the dive to the motor, whereby an error-free, accurate control is provided for the automatic shutter release circuit of a photomicrographic apparatus.

For the convenience of taking a color photograph, the automatic exposure control circuit according to the invention includes a circuit which measures the color temperature of the light which irradiates the specimen being photographed. The result of the measurement can be utilized in the adjustment of the brightness of the illuminating light source or the choice of a color temperature adjusting filter in order to adjust the color temperature of the irradiating light to one most suited to the intended photographing operation.

Where a magnification is changed in taking a color photograph, a meter in the circuit for measuring the color temperature may be connected with the photoelectric transducer element in the electronic shutter circuit to form an exposure meter circuit, which permits a comparison against the optimum exposure period determined during the normal photographing operation, thereby enabling a consistent color reproduction through an adjustment of filters. Specifically, if the magnification of the microscope is increased, the amount of light reaching the film surface will be reduced with a corresponding increase in the exposure period. In particular, where the magnification is greatly changed when taking pictures on a single film, differential color reproductions may result even though the color temperature remains constant. This is known as the reciprocity law failure. In order to produce a consistent color reproduction under such condition, the exposure period may be held constant, which can be advantageously achieved by using the exposure meter circuit mentioned above.

In this manner, the automatic exposure control circuit according to the invention incorporates various circuits which are effective in a fully automatic photomicrographic operation in assuring that a failure-free, favorable photograph can be taken.

DETAILED DESCRIPTION OF A PREFERRED EMBODIMENT OF THE INVENTION

Figure 1:
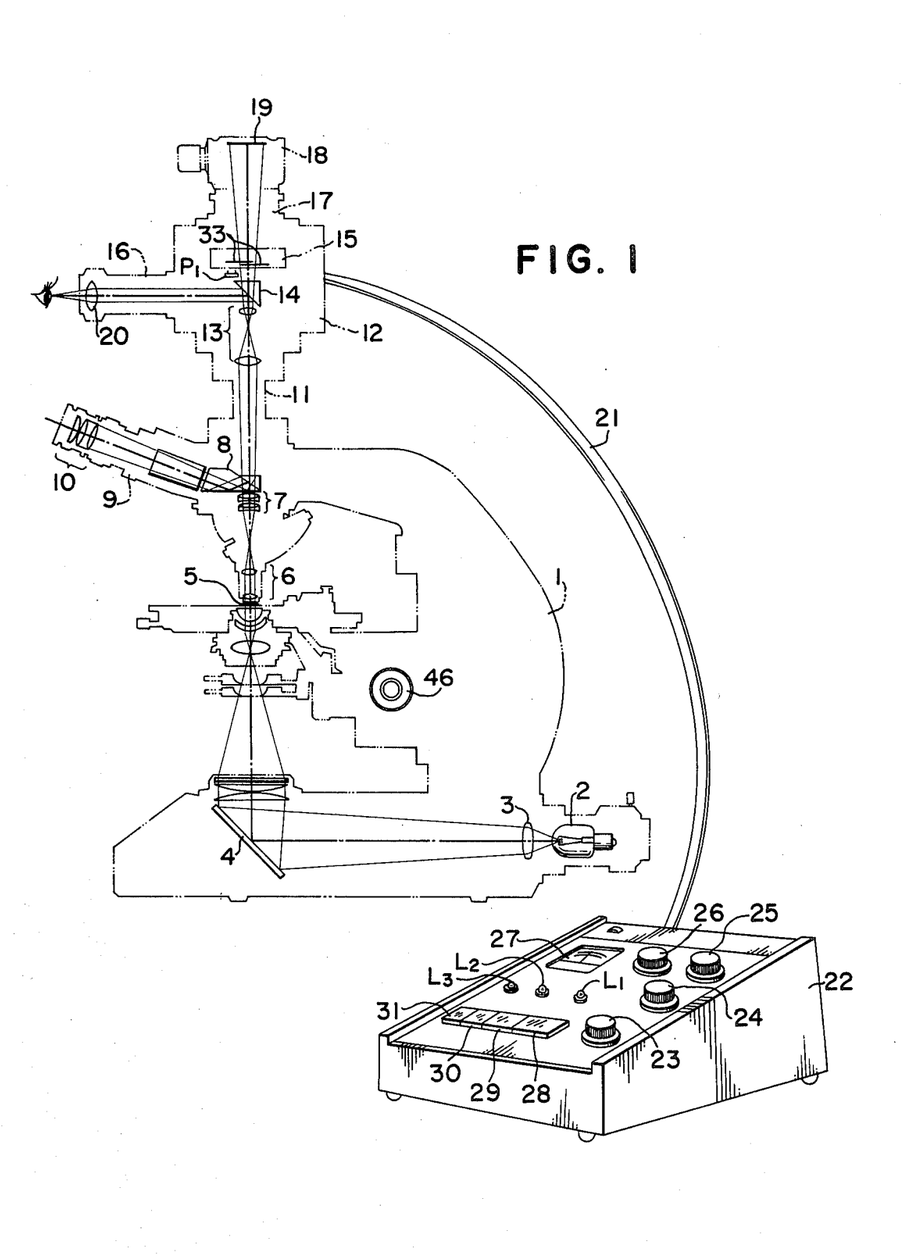
FIG. 1 is a schematic view illustrating an example of a microscope with photographic apparatus to which the invention is applied.

Referring to FIG. 1, there is shown a microscope with photographic apparatus to which the invention is applied, as comprising a microscope body 1. Internally housed within the bottom portion of the body 1 are a light source indicated as a lamp 2, a condenser lens 3 and a reflecting mirror 4 which constitute together an illumination optical system. The light from the illumination system is passed through a specimen 5, an objective lens 6 and an intermediate magnification changing lens system 7, and is subsequently split by a first path splitting prism 8 into an observation optical system and a photographing optical system. The light in the observation optical system is conducted through an observation binocular barrel 9 to an eyepiece 10 while the light in the photographing optical system is conducted through a photographic barrel 11 into an automatic exposure unit 12. The automatic exposure unit 12 includes a photographic lens 13, a second path splitting prism 14 and an electronic shutter mechanism 15. The housing for the unit 12 is laterally provided with a viewer barrel 16 including an eyepiece 20, to which an observer moves his eyes from the observation binocular barrel 9 when taking a picture of the specimen being observed. At its top, the unit 12 is provided with a camera barrel 17 to which a camera body 18 is detachably mounted. The camera body 18 houses a loaded film 19, usually of 35 mm size, and an automatic film winding mechanism. In the photomicrographic apparatus described, it is customary that the film, the shutter mechanism and the photographing lens are separated from each other. The photosensitive film 19 which is loaded into the camera body 18 is suitably changed depending on which of black-and-white or color photograph is desired.

The light of the photographing optical system which is introduced into the automatic exposure unit 12 passes through the photographing lens 13 and is subsequently split by the second path splitting prism 14 into a viewer path and an exposure path. The light in the viewer path passes through the viewer barrel 16 to the eyepiece 20 while the light in the exposure path reaches the photosensitive film 19 through the electronic shutter. In one example, the second prism 14 splits the light proportionally such that 80% of the incident light is directed to the exposure path while the remaining 20% is directed to the viewer path.

A photoelectric transducer element $P_1$ which represents the light receiving element of the electronic shutter circuit is disposed adjacent to the second prism 14, and the operation of the electronic shutter circuit is controlled in accordance with the amount of light incident on the element $P_1$ so as to provide a proper exposure. The shutter mechanism 15 disposed within the automatic exposure unit 12 is controlled by the automatic exposure control circuit according to the invention. The automatic exposure control circuit is disposed within an automatic exposure control box 22 which is separate from the microscope and which is electrically connected with the electronic shutter mechanism and the photoelectric transducer element $P_1$ through a connection cord 21.

On its top panel, the automatic exposure control box 22 includes an operating knob 23 of a change-over switch including a power switch, a knob 24 for setting a film speed, a knob 25 for fine adjustment of the film speed, a color temperature knob 26, a dial 27 for a color temperature meter which serves also as an exposure meter, a lamp $L_1$ for displaying that an automatic exposure is feasible, another lamp $L_2$ for displaying an automatic exposure period, an alarm lamp $L_3$, a release button 28 which is to be depressed when releasing the shutter, a manual button 29 for resetting the exposure in a manual exposure operation, an automatic film winding button 30, and a push button 31 for connecting the photoelectric transducer element $P_1$ with the color temperature meter, all accessible on the top panel for direct manual operation. In one example, the lamp $L_1$ is illuminated in green color when an automatic exposure is feasible while the lamp $L_2$ is illuminated in orange color only during the period during which the electronic shutter is in operation. The alarm lamp $L_3$ is illuminated in red color when the exposure of the entire film length is completed, that is, when unexposed film is no longer available.

Figure 2:
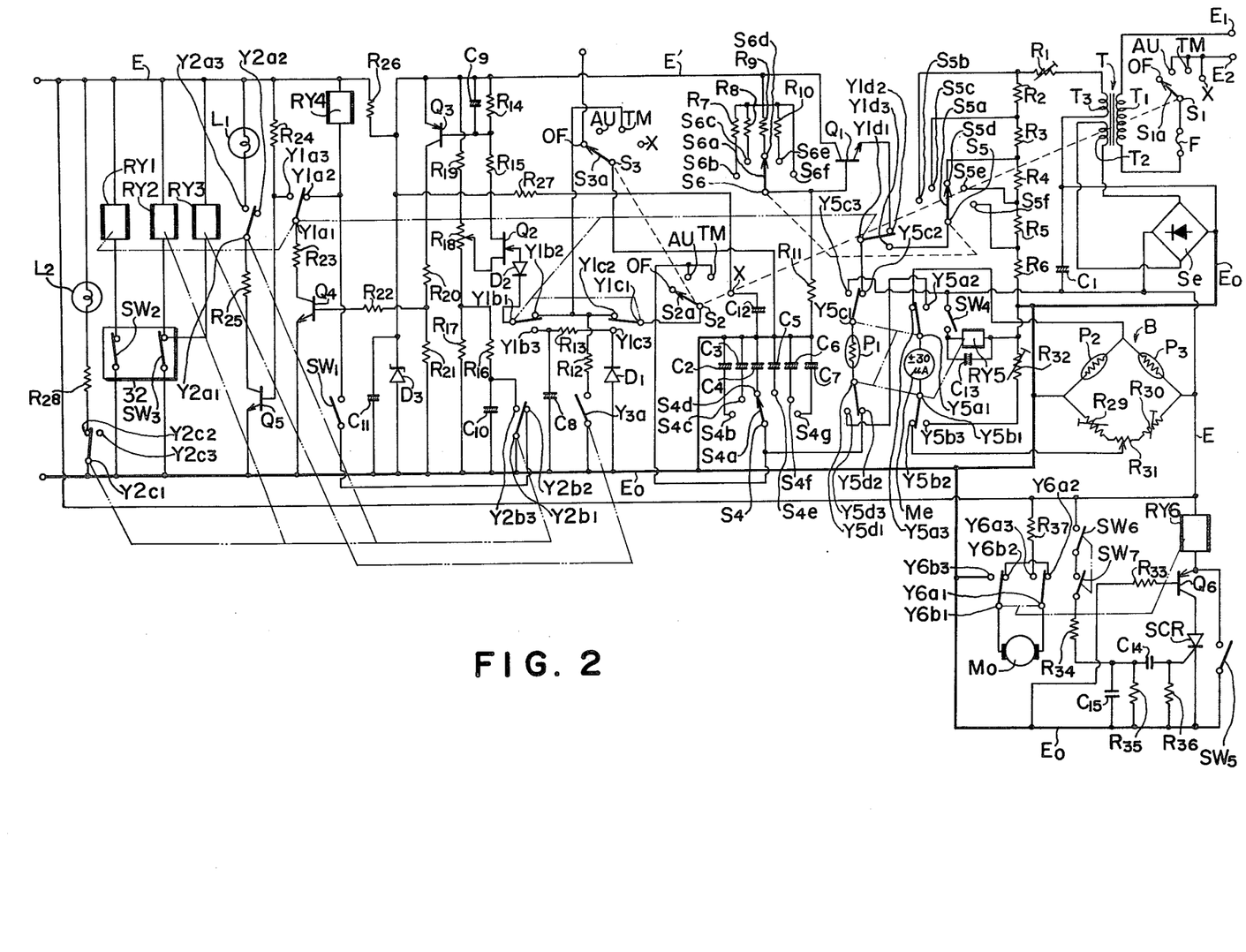
FIG. 2 is a circuit diagram of one embodiment of the automatic exposure control circuit according to the invention.

The automatic exposure control circuit according to the invention which is internally housed within the control box 22 is arranged as shown in FIG. 2. Referring to FIG. 2, power input terminals $E_1$, $E_2$ are adapted to be connected with an a.c. power source, not shown. These terminals are connected with a primary coil $T_1$ of a power transformer T through a fuse F and a change-over switch $S_1$. The switch $S_1$ has four contacts as do switches $S_2$ and $S_3$ with which it is (i.e. ganged). These switches are operated by the operating knob 23 as follows: When the movable contacts $S_{1a}$ to $S_{3a}$ of the respective switches $S_1$ to $S_3$ are thrown to a fixed contact OF, no power connection is made. When the movable contacts are changed to another fixed contact AU, the circuit is connected with the power source, and the control circuit is ready for an automatic exposure operation. When the movable contacts are changed to a further contact TM, the automatic exposure control circuit is disconnected, and the exposure is manually controlled irrespective of the control circuit. When the movable contacts are changed to an additional fixed contact X, the exposure control circuit is conditioned for taking pictures under a stroboscopic light. Thus, the switch $S_1$ represents a power switch, while the switches $S_2$ and $S_3$ choose a suitable circuit to operate under various photographing conditions.

A full wave rectifier bridge Se is connected across one of the secondary coils, $T_2$, of the transformer T and, one of its output terminals is connected with a ground line $E_0$ while the other output terminal is connected with a supply line E for the exposure control circuit. A smoothing capacitor $C_1$ is connected across the supply line E and the ground line $E_0$.

The transformer T has another secondary coil $T_3$ which has its one terminal connected with the ground line $E_0$ while the other terminal is connected with a change-over switch $S_5$ through a semi-fixed resistor $R_1$, the switch $S_5$ being provided for fine adjustment of the film speed. Specifically, a series circuit comprising resistors $R_2$, $R_3$, $R_4$, $R_5$ and $R_6$ in addition to the semi-fixed resistor $R_1$ is connected across the secondary coil $T_3$, and the junctions between the respective resistors are connected with separate fixed contacts $S_{5b}$ to $S_{5f}$, respectively, of the change-over switch $S_5$. The switch $S_5$ comprises a rotary switch having a movable contact arm $S_{5a}$ and five fixed contacts, and is interlocked with another change-over switch $S_6$ having a movable contact arm $S_{6a}$ and five fixed contacts $S_{6b}$ to $S_{6f}$ which are connected with a supply line E' through respective resistors $R_7$, $R_8$, $R_9$, $R_{10}$ and directly. When the knob 25 (FIG. 1) is turned, the movable contact arms $S_{5a}$ and $S_{6a}$ of the switches $S_5$ and $S_6$ are switched across these fixed contacts for the purpose of fine adjustment of the film speed.

The film speed is principally established by a change-over switch $S_4$ which may comprise a rotary switch, for example, having a movable contact arm $S_{4a}$ and six fixed contacts $S_{4b}$ to $S_{4g}$ which are connected with the ground line $E_0$ through respective capacitors $C_2$ to $C_7$. By turning the knob 24 (FIG. 1), the movable contact arm $S_{4a}$ is switched across these fixed contacts to establish a film speed, and a fine adjustment is effected by means of the switches $S_5$ and $S_6$.

The principal film speed establishing circuit and the fine adjustment circuit are interconnected through a relay contact $Y1_{d1}$ and a transistor $Q_1$. Specifically, the movable contact arm $S_{6a}$ of the switch $S_6$ is connected with the base of the transistor $Q_1$, and the resistor $R_{11}$ is connected across the base and the ground line $E_0$. The transistor $Q_1$ has its collector connected with the supply line E' and its emitter connected with a normally closed contact $Y1_{d2}$ of a relay RY1 to be described later. The relay RY1 is constructed such that its movable contact $Y1_{d1}$ normally engages the normally closed contact $Y1_{d2}$, but switches to another contact $Y1_{d3}$ when the relay coil RY1 is energized. The contact $Y1_{d3}$ is connected with the movable contact $S_{5a}$ of the switch $S_5$. The movable contact $Y1_{d1}$ is also connected with a normally closed contact $Y5_{c2}$ of a relay RY5 to be described later, which normally closed contact $Y5_{c2}$ is normally engaged with a movable contact $Y5_{c1}$, but when the relay coil $RY_5$ is energized, the movable contact $Y5_{c1}$ changes to its other contact $Y5_{c3}$.

The photoelectric transducer element $P_1$ which receives light from a specimen being photographed is connected between the movable contact $Y5_{c1}$ and its other movable contact $Y5_{d1}$. The photoelectric transducer element $P_1$ comprises an element such as CdS which exhibits a varying resistance in response to light. The movable contact $Y5_{d1}$ is also adapted to be switched upon energization of the relay coil RY5, and normally engages a normally closed contact $Y5_{d2}$, but switches to another contact $Y5_{d3}$ when the relay coil is energized. The contact $Y5_{d3}$ is also connected with another contact $Y5_{a2}$, while the contact $Y5_{d2}$ is connected with the movable contact $S_{4a}$ of the change-over switch $S_4$. This movable contact $S_{4a}$ is also connected with the fixed contacts AU and TM of the switch $S_2$ for applying an operating voltage to the switching circuit including FET (field effect transistor) $Q_2$ through the movable contact $S_{2a}$ of the switch $S_2$.

Thus, the movable contact $S_{2a}$ is connected with a movable contact $Y1_{c1}$ which is switched by a relay coil RY1, the contact $Y1_{c1}$ normally engaging a normally closed contact $Y1_{c2}$. The normally closed contact $Y1_{c2}$ is connected with another normally closed contact $Y1_{b2}$. The movable contact $Y1_{c1}$ which engages the normally closed contact $Y1_{c2}$ is adapted to engage another contact $Y1_{c3}$ when it is switched by the operation of the relay coil RY1. A movable contact $Y1_{b1}$ which engages the normally closed contact $Y1_{b2}$ is adapted to engage another contact $Y1_{b3}$ when it is swtiched. The normally closed contact $Y1_{c2}$ is also connected with a fixed contact TM of the switch $S_3$. A series circuit including a resistor $R_{12}$ and a normally closed relay contact $Y3_a$ is connected across the normally closed contact $Y1_{c2}$ and the ground line $E_0$. The relay contact $Y3_a$ is opened when a relay coil RY3 to be described later is operated. The contacts $Y1_{c3}$ and $Y1_{b3}$ are interconnected through a resistor $R_{13}$, and a rectifying diode $D_1$ is connected between the contact $Y1_{c3}$ and the ground line $E_0$ while a smoothing capacitor $C_8$ is connected between the contact $Y1_{b3}$ and the ground line $E_0$. The above described arrangement constitutes the input circuit of the switching circuit.

The switching circuit including FET $Q_2$ comprises transistors $Q_2$ to $Q_5$, resistors $R_{14}$ to $R_{25}$, capacitors $C_9$ to $C_{11}$, diodes $D_2$ and $D_3$ and various relay contacts. Specifically, the transistor $Q_2$ comprises an FET which has its gate connected through diode $D_2$ to the movable contact $Y1_{b1}$ and its source connected with the supply line F' through a series circuit including resistors $R_{14}$ and $R_{15}$ while its drain is connected with a variable point on a variable resistor $R_{18}$ in a voltage divider circuit. The voltage divider circuit comprises a series circuit including resistors $R_{17}$, $R_{18}$ and $R_{19}$ which are connected through a resistor $R_{26}$ to the supply line E and the ground line $E_0$. The resistor $R_{18}$ which comprises a variable resistor permits the drain voltage to be adjusted. The resistor $R_{14}$ is shunted by a capacitor $C_9$, and the junction between the resistors $R_{14}$ and $R_{15}$ is connected with the base of the transistor $Q_3$. The transistor $Q_3$ has its emitter connected with a supply line E′ and its collector connected to the ground line $E_0$ through a series circuit including resistors $R_{20}$ and $R_{21}$.

The resistor $R_{26}$ is a voltage drop resistor, and the voltage on the supply line E′ having a potential reduced by the voltage drop across the resistor $R_{26}$ is further stabilized by a constant voltage diode $D_3$ and a capacitor $C_{11}$ connected between the line E′ and the ground line $E_0$, thus contributing to the stabilization of the operation of the circuit.

The junction beween the resistors $R_{20}$ and $R_{21}$ is connected through a resistor $R_{22}$ with the base of the transistor $Q_4$ which has its emitter connected to the ground line $E_0$. The transistor $Q_4$ has its collector connected through a resistor $R_{23}$ with the movable contact $Y1_{a1}$ of the relay RY1. The movable contact $Y1_{a1}$ normally engages a normally closed contact $Y1_{a2}$, but is adapted to engage the other contact $Y1_{a3}$ when the relay is switched. The contact $Y1_{a3}$ is connected through a resistor $R_{24}$ with the supply line E, and an electromagnet RY4 for resetting shutter blades to be described later is connected between the normally closed contact $Y1_{a2}$ and the supply line E. The contact $Y1_{a3}$ is also connected with the base of the transistor $Q_5$, which has its emitter connected with the ground line $E_0$ while its collector is connected through a resistor $R_{25}$ to the movable contact $Y2_{a1}$ of a relay RY2 to be described later. When the relay coil RY2 is energized, the movable contact $Y2_{a1}$ is switched to the other contact $Y2_{a3}$, which is connected with the supply line E through a lamp $L_1$ which functions to display that an automatic exposure is feasible.

The normally closed contact $Y1_{a2}$ is connected through a normally open switch $SW_1$ with a normally closed contact $Y2_{b2}$. The normally open switch $SW_1$ is adapted to be closed when the time-out button 29 (see FIG. 1) is depressed for resetting the exposure in a manual exposure operation, thereby energizing the electromagnet RY4 for resetting the shutter blades. When the relay coil RY2 is energized, the movable contact $Y2_{b1}$ is switched from the normally closed contact $Y2_{b2}$ to another contact $Y2_{b3}$, which is connected with the junction between a resistor $R_{16}$ and a capacitor $C_{10}$ which are in turn connected in shunt with the resistor $R_{17}$. The capacitor $C_{10}$ is provided for the purpose of correcting an exposure period, and functions, when the brightness is high, to introduce a slight delay in the switching operation of the transistor $Q_2$.

A capacitor $C_{12}$ is connected between the fixed contact X of the change-over switch $S_2$ and the ground line $E_0$, while a resistor $R_{27}$ is connected between the contact X and the supply line E′. The resistor $R_{27}$ and capacitor $C_{12}$ form a time constant circuit for establishing a synchro period when taking pictures under a stroboscopic light.

The relay coils RY1, RY2 and RY3 for switching the associated movable contacts are connected as follows: The relay coil RY1 is connected between the supply line E and the ground line $E_0$ in series with a normally closed switch $SW_2$, while the relay coils RY2 and RY3 are connected in parallel with each other and in series with a normally closed switch $SW_3$ across the supply line E and the ground line $E_0$. The normally closed switches $SW_2$ and $SW_3$ are opened in synchronism with a release operation of the shutter, and are disposed within a shutter housing (see FIG. 3). As the shutter is released to commence a movement of the shutter blades, the switch $SW_2$ is opened initially, and when the shutter is fully opened, the switch $SW_3$ is opened. The relay coils RY1 and RY3 are energized when the switches $SW_2$ and $SW_3$ are closed. Thus, when the relay coil RY1 is energized, its associated movable contacts $Y1_{a1}$, $Y1_{b1}$, $Y1_{c1}$ and $Y1_{d1}$ are switched; when the relay coil RY2 is energized, its associated movable contacts $Y2_{a1}$, $Y2_{b1}$ and $Y2_{c1}$ are switched; and when the relay coil RY3 is energized, the associated normally open relay contact $Y3_a$ is closed.

A lamp $L_2$ for displaying an automatic exposure period is connected between the supply line E and the ground line $E_0$ through a resistor $R_{28}$ and a normally closed contact $Y2_{c2}$ associated with the relay RY2, and is extinguished when the movable contact $Y2_{c1}$ is switched to the other contact $Y2_{c3}$.

The color temperature measuring circuit comprises a bridge circuit B including light receiving elements $P_2$ and $P_3$, semi-fixed resistors $R_{29}$ and $R_{30}$ and a variable resistor $R_{31}$, and an indicater meter Me. The input terminals of the bridge circuit B are connected with the supply line E and the ground line $E_0$, respectively, while one of its output terminals is connected with a normally closed contact $Y5_{a3}$ associated with a relay RY5 and the other output terminal which is connected with a movable point on the variable resistor $R_{31}$ is connected with a normally closed contact $Y5_{b2}$ associated with the relay RY5. Normally, a movable contact $Y5_{b1}$ engages the normally closed contact $Y5_{b2}$ and a movable contact $Y5_{a1}$ engages the normally closed contact $Y5_{a3}$, and the indicating meter Me is connected across these movable contacts. The meter Me has the dial 27 (see FIG. 1) which is of a home position control type, that is, an adjustment is made until the pointer of the meter coincides with the home position.

Referring to the exposure meter circuit which is formed by connecting the photoelectric transducer element $P_1$ with the indicating meter Me, the connection therebetween is adapted to be switched by relay contacts. The switching is performed under the control of the relay coil RY5 which is connected across the supply line E and the ground line $E_0$ through a normally open, exposure meter switch $SW_4$. When the switch $SW_4$ is closed to energize the relay coil RY5, its movable contacts $Y5_{a1}$, $Y5_{b1}$, $Y5_{c1}$ and $Y5_{d1}$ are switched to the other contacts $Y5_{a2}$, $Y5_{b3}$, $Y5_{c3}$ and $Y5_{d3}$, respectively, thus connecting the photoelectric transducer element $P_1$, the indicating meter Me and a semi-fixed resistor $R_{32}$ in series across the supply line E and the ground line $E_0$, thus forming the exposure meter circuit. A capacitor $C_{13}$ is connected in shunt with the relay coil RY5 to dissipate the reverse e.m.f. thereof.

Referring now to the automatic shutter release circuit, this comprises a relay coil RY6, a transistor $Q_6$ and a thyristor SCR which together operate to control the energization of an electric motor $M_0$. Specifically, the relay coil RY6 is connected between the supply line E and the emitter of the transistor $Q_6$, and the thyristor SCR is connected between the collector of this transistor and the ground line $E_0$. A cam controlled switch $SW_5$ is connected between the emitter of $Q_6$ and the ground line $E_0$, and a resistor $R_{33}$ is connected between the base of transistor $Q_6$ and the ground line $E_0$. The gate of the thyristor SCR is connected with the supply line E through a series circuit including a capacitor $C_{14}$, resistor $R_{34}$, and normally open switches $SW_6$ and $SW_7$. The junction between the resistor $R_{34}$ and the capacitor $C_{14}$ is connected with the ground line $E_0$ through a parallel combination of a capacitor $C_{15}$ and a resistor $R_{35}$, while a resistor $R_{36}$ is connected between the gate of the SCR and the ground line $E_0$. The resistor $R_{36}$ and the capacitor $C_{14}$ form a differentiator circuit, thus differentiating the voltage developed across the resistor $R_{35}$ to supply a firing voltage to the gate of the thyristor SCR. The switches $SW_6$ and $SW_7$ are interlocked with each other, and are closed upon depression of the release button 28 (see FIG. 1). The motor $M_0$ is connected across the both movable contacts $Y6_{a1}$ and $Y6_{b1}$ of the relay RY6. Normally closed contacts $Y6_{a2}$ and $Y6_{b2}$ of the relay RY6 are connected with each other, and a resistor $R_{37}$ is connected between the supply line E and a contact $Y6_{a3}$ associated with the movable contact $Y6_{a1}$. A contact $Y6_{b3}$ associated with the movable contact $Y6_{b1}$ is connected with the ground line $E_0$.

Figure 3:
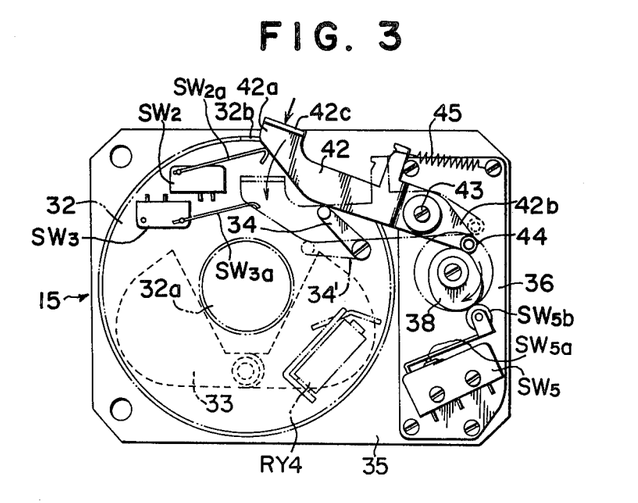
FIG. 3 is a plan view of an electronic shutter mechanism which is operated by the automatic shutter release circuit of the invention.
Figure 4:
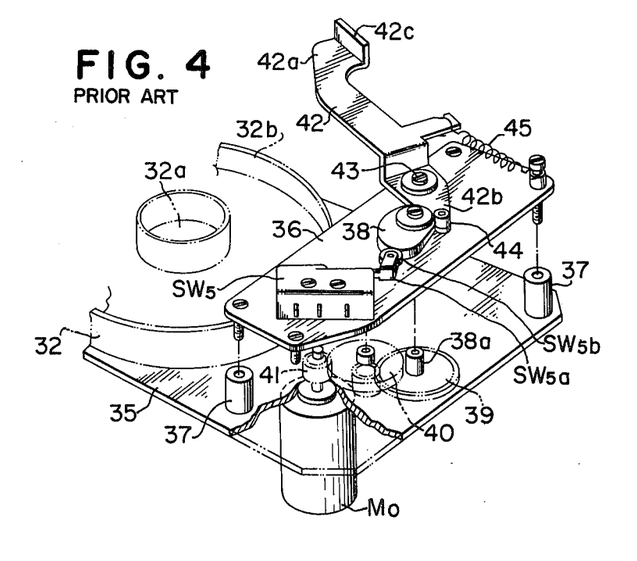
FIG. 4 is an exploded, perspective view of principal parts of the mechanism shown in FIG. 3.

Referring to FIGS. 3 and 4, there is shown a shutter mechanism which is operated by the automatic shutter release circuit described above, the mechanical portions for shutter operation (excluding the switches SW2, SW3 and SW5) being a prior art structure as shown, for example, in U.S. Pat. No. 3,625,127 issued Dec. 7, 1971 and assigned to the assignee of the present invention. The mechanism includes a casing 32, shown in phantom lines, which corresponds to the housing of the electronic shutter mechanism 15 disposed above the second prism 14 as shown in FIG. 1. Mounted within the casing around a central opening 32a are shutter blades 33, the electromagnet RY4 for closing the blades, a release member 34 for opening the blades 33 as well as other members (not shown) which are necessary for the opening and closing of the blades. The shutter assembly is mounted on a base plate 35, and as the release member 34 is externally operated to move it to the position shown in chain lines 34', the shutter blades 33 move to uncover the opening 32a, thereby allowing the photographing light to reach the surface 19 of photosensitive material and activating the photoelectric transducer element $P_1$ (see FIGS. 1 and 2). When a proper amount of exposure has been reached on the surface of photosensitive material, the electromagnet RY4 is operated to move the shutter blades 33 so as to cover the opening 32a.

A rectangular, mounting plate 36 is fixed to spacer posts 37 which are fixedly mounted on the base plate 35. An eccentric cam 38 is rotatably mounted at a central location on the mounting plate 36, and has its shaft 38a extending through the plate 36 downwardly, as shown in FIG. 4, and carrying a gear 39 thereon. The gear 39 meshes with a stepped gear 40, which in turn meshes with a pinion gear 41 fixedly mounted on the output shaft of the samll motor $M_0$ that is mounted on the base plate 35. The arrangement is such that the cam 38 undergoes one revolution through the action of the reduction gearing and the motor. A rocking bar 42 and the change-over switch $SW_5$ are disposed on the mounting plate 36 on the opposite sides of the cam 38. The rocking bar 42 is pivotally mounted at 43 on the plate 36, and has its one arm 42a extending into the casing 32 through a notch 32b formed in the peripheral wall thereof. The other arm 42b of the rocking bar has a roller 44 rotatably mounted on its free end, and the roller is held in abutting relationship with the peripheral surface of the cam 38 as a result of the rocking bar 42 being urged to rotate clockwise, as viewed in FIG. 4, by a tension spring 45 extending between the rocking bar 42 and the plate 36. Consequently, as the cam 38 rotates, the rocking arm 42 is operated by the cam surface to move further into the casing 32 against the resilience of the spring 45, as shown in phantom lines in FIG. 3, thus causing the release member 34 to release the shutter. Said one arm 42a of the rocking bar 42 is formed with an upright piece 42c which is folded from one lateral edge at the extremity thereof. The upright piece 42c is adapted to be pushed by a release cable or the like to operate the release member 34 when a manual operation of the electronic shutter is desired. The change-over switch $SW_5$ mounted on the plate 36 includes an actuator $SW_5a$ carrying a roller $SW_5b$ which bears against the peripheral surface of the cam 38 as a result of the actuator $SW_5a$ being urged to rotate counterclockwise. After one revolution, the cam 38 comes to a stop at a preselected position in which the roller 44 on the rocking bar 42 bears against the cam 38 at its reduced diameter and the roller $SW_5b$ of the actuator $SW_5a$ associated with the switch $SW_5$ bears against the cam 38 at its increased diameter.

The normally closed switches $SW_2$ and $SW_3$ which are connected with the relay coils RY1, RY2 and RY3 are disposed within the casing 32 as shown in FIG. 3. Each of the switches $SW_2$ and $SW_3$ includes an actuator $SW_2a$ or $SW_3a$, respctively, which extends into the path of travel of the arm 42a of the rocking bar 42. Thus, when the rocking arm 42 is rocked to release the shutter, the actuator $SW_2a$ of the switch $SW_2$ is initially actuated to open the switch $SW_2$, and subsequently the actuator $SW_3a$ of the switch $SW_3$ is actuated to open the switch $SW_3$ when the release member 34 is operated to open the shutter blades 33, thus clearing the central opening 32a.

The automatic exposure control circuit mentioned above operates as follows;

Initially, the operation of the circuit will be described when a picture is automatically taken of the specimen 5 which has been observed while adjusting the focus by means of a rough and vernier adjustment knob 46 (see FIG. 1). In this instance, the operating knob 23 (see FIG. 1) is turned to change the switches $S_1$, $S_2$ and $S_3$ so as to connect their movable contacts $S_{1a}$, $S_{2a}$ and $S_{3a}$ with the fixed contacts AU. Now the switch $S_1$ or the power switch is closed to turn on the automatic exposure control circuit of the invention. Before proceeding with the operation, a photographic film which is used in taking a picture is mounted in the camera body 18 (see FIG. 1), and the knobs 24 and 25 which are provided in the automatic exposure control box 22 for the purpose of establishing the film speed and for fine adjustment thereof are turned to switch the change-over switches $S_4$, $S_5$ and $S_6$ in accordance with the given film speed. The next operation in the photographing procedure when the circuit is turned on is to adjust the color temperature. Where a color film is used, it is necessary to adjust the color temperature of the light from the light source lamp 2 so that it is made as close to natural light or sunbeam as possible. This adjustment is performed while observing the color temperature meter Me or its dial 27 exposed on the top panel of the box 22, as shown in FIG. 1. The adjustment is made so that the pointer is positioned at its home position or "0". If the pointer deflects to the left of the home position, this means that the color temperature of the irradiating light is below the given color temperature, and conversely if the pointer deflects to the right of the home position, the color temperature of the irradiating light is higher. In the former instance, the voltage supply for the lamp 2 is increased or a filter having an increased density is inserted, and in the latter instance, a reverse procedure is employed. In this manner, the color temperature of the irradiating light is adjusted to a value which is suitable for the purpose of taking a picture.

When the automatic exposure control circuit is turned on by the closure of the power switch $S_1$, the relay coils RY1, RY2 and RY3 which are connected with the now closed switches $SW_2$ and $SW 3$ are energized to change their movable contacts. The energization of the relay coil RY1 causes its movable contact $Y1_{a1}$ to be switched to its contact $Y1_{a3}$, its movable contact $Y1_{b1}$ switched to its contact $Y1_{b3}$, its movable contact $Y1_{c1}$ switched to its contact $Y1_{c3}$, and its movable contact $Y1_{d1}$ to be switched to its contact $Y1_{d3}$, respectively. The energization of the relay coil RY2 causes its movable contact $Y2_{a1}$ to be switched to its contact $Y2_{a3}$, its movable contact $Y2_{b1}$ to be switched to its contact $Y2_{b3}$ and its movable contact $Y2_{c1}$ to be switched to its contact $Y2_{c3}$, respectively. The energization of the relay coil RY3 causes its relay contact Y3a to be closed. As a result of the switching of the movable contacts of the relay RY1, a current flow is established, in the illustrative position of the switches shown in FIG. 2, through resistors $R_1$, $R_2$, $R_3$, through switch $S_5$, through movable contact $Y1_{d1}$, through movable contact $Y5_{c1}$, through photoelectric transducer element $P_1$, through movable contact $Y5_{d1}$, through change-over switch $S_4$, through capacitor $C_4$ to the ground line $E_0$. This current flow develops a voltage drop across the photoelectric transducer element $P_1$. Since the resistance of the photoelectric transducer element $P_1$ varies with the intensity of light which it receives from the specimen, the voltage drop thereacross will be small when the light is too bright for the photographing operation. As mentioned previously, an optimum photographing is achieved in a photomicrographic apparatus with an exposure period greater than 1/100 second. Thus, in order to secure against an exposure period less than such a value, it is necessary to detect a value for the voltage drop acorss the photoelectric transducer element $P_1$ at which the exposure period will be less than 1/100 second.

In the circuit of the invention, the FET $Q_2$ in the switching circuits detects a voltage drop value across the transducer element $P_1$ at which the exposure period will be less than 1/100 second. Specifically, the gate voltage for the transistor $Q_2$ is established such that it conducts for a voltage drop across the transducer element $P_1$ which will produce an exposure period less than 1/100 second. In this sense, the switching circuit functions as a threshold circuit. The voltage drop across the transducer element $P_1$ is applied to the gate of the FET $Q_2$ through a circuit including switch $S_2$, movable contact $Y1_{c1}$, resistor $R_{13}$, movable contact $Y1_{b1}$ and diode $D_2$. The voltage drop is converted into a d.c. voltage by the rectifying diode $D_1$, smoothing resistor $R_{13}$ and capacitor $C_8$. If the applied gate voltage has a value which corresponds to an exposure period greater than 1/100 second, the FET $Q_2$ immediately conducts to cause a conduction of the transistor $Q_3$. The transistors $Q_4$ and $Q_5$ will also conduct since the movable contacts $Y1_{a1}$ and $Y2_{a1}$ are switched to the contacts $Y1_{a3}$ and $Y2_{a3}$, respctively. When the transistor $Q_5$ conducts, a current flow is established through the display lamp $L_1$ which therefore will be illuminated, displaying that an automatic exposure is feasible if the shutter is released. At this time, since the movable contact $Y2_{c1}$ is switched to the contact $Y2_{c3}$, the lamp $L_2$ which displays an automatic exposure period will not be illuminated.

When the lamp $L_1$ is illuminated, indicating that an automatic exposure is feasible, the release button 28 (see FIG. 1) in the control box 22 may be depressed to operate the automatic shutter release circuit. When the release button 28 is depressed, the switches $SW_6$ and $SW_7$ in the circuit of FIG. 2 are closed, whereby a current flow is established through the switches $SW_6$ and $SW_7$ and through resistors $R_{34}$ and $R_{35}$, thereby producing a voltage drop across the resistor $R_{35}$. This voltage drop is differentiated by the differentiator circuit comprising the capacitor $C_{14}$ and the resistor $R_{36}$ to produce a pulse voltage, which is applied to the gate of the thyristor SCR as a firing voltage. Thereupon, the thyristor SCR is fired to conduction, whereby current flows through the transistor $Q_6$ and the relay coil RY6, energizing the relay coil RY6 to switch its movable contacts $Y6_{a1}$ and $Y6_{b1}$ to its contacts $Y6_{a3}$ and $Y6_{b3}$, respectively. This switching completes a circuit through the resistor $R_{37}$, movable contact $Y6_{a1}$, motor $M_0$ and movable contact $Y6_{b1}$, thus starting the motor $M_0$.

As the motor rotates, the cam 38 mounted on the plate 36 is driven to rotate in the direction indicated in FIG. 3 through the reduction gearing 41, 40, 39 (see FIG. 4), so that the rocking bar 42 which follows the peripheral surface of the cam 38 is rocked counterclockwise about its pivot 43, whereby its one arm 42a urges the release member 34 within the shutter casing 32 to release the shutter. During the initial phase of its rocking motion, the rocking bar 42 bears against the actuator $SW_2a$ of the switch $SW_2$, whereby the switch $SW_2$ is opened. When the switch $SW_2$ is opened, the relay coil RY1 is deenergized, so that its movable contacts $Y1_{a1}$, $Y1_{b1}$, $Y1_{cl}$ 6 and $Y1_{d1}$ are returned to their home position, engaging the associated normally closed contacts $Y1_{a2}$, $Y1_{b2}$, $Y1_{c2}$ and $Y1_{d2}$, respectively, as shown in FIG. 2. This switching operation resets the operation of the switching circuit including the FET $Q_2$, thus rendering the transistors $Q_2$, $Q_3$ and $Q_4$ non-conductive.

Now the time constant circuit comprising the photoelectric transducer element $P_1$ and the capacitor $C_4$ connected therewith forms an electronic shutter circuit together with the switching circuit. The electronic shutter circuit commences its operation from the time the switch $SW_3$ is changed by the rocking bar 42 when, subsequent to the release of the shutter by the release member 34, the shutter blades 33 become fully open and the opening 32a (see FIG. 3) is completely uncovered. Specifically, one arm 42a of the rocking bar 42 bears against the actuator $SW_2a$ of the switch $SW_2$ to open this switch, and then immediately bears against the actuator $SW_3a$ of the other switch $SW_3$ to open this switch also. As the switch $SW_3$ is opened, the relay coils RY2 and RY3 are deenergized, so that their movable contacts $Y2_{a1}$, $Y2_{b1}$, $Y2_{c1}$ and $Y3_a$ return to their initial position. The engagement between the movable contact $Y2_{a1}$ and the normally open contact $Y2_{a2}$ extinguishes the lamp $L_1$ which has indicated the feasibility of an automatic exposure, and the engagement between the movable contact $Y2_{c1}$ and the normally closed contact $Y2_{c2}$ illuminates the lamp $L_2$ which displays an automatic exposure period. Thus the lamps $L_1$ and $L_2$ are alternately illuminated. The opening of the relay contact $Y3_a$ causes an input voltage to be applied to the switching circuit from the time constant circuit, whereby the electronic shutter circuit commences its operation simultaneously with the illumination of the lamp $L_2$. Specifically, the engagement between the movable contacts $Y1_{b1}$, $Y1_{c1}$ and the normally closed contacts $Y1_{b2}$, $Y1_{c2}$, respectively, permits the terminal voltage across the capacitor $C_4$ which forms part of the time constant circuit to be applied to the gate of the FET $Q_2$ through an input circuit comprising change-over switch $S_4$, switch $S_2$, movable contact $Y1_{c1}$, movable contact $Y1_{b1}$ and diode $D_2$. As is well known, in the electronic shutter circuit, the photoelectric transducer element $P_1$ exhibits a resistance which varies with the intensity of light from an object being photographed, and a corresponding current charges the capacitor, the terminal voltage of which operates the switching circuit upon reaching a constant value. This value of the capacitor voltage corresponds to that used in the switching circuit when determining the feasibility of an automatic exposure.

After the shutter is released, the blades 33 (see FIG. 3) move to the fully open position, uncovering the opening 32a and commencing the exposure. When a proper amount of exposure has been reached on the surface of the photosensitive film 19 (see FIG. 1), the switching circuit operates the electromagnet RY4 to close the blades 33, thus terminating the photographing operation.

On the other hand, as soon as the cam 38 (see FIGS. 3 and 4) commences to rotate, a normally open switch $SW_5$ is immediately closed. When the switch $SW_5$ is closed, the emitter of the transistor $Q_6$ is connected with the ground line $E_0$, so that the current flow through the thyristor SCR is interrupted. However, the current flow through the relay coil RY6 is maintained through the switch $SW_5$, so that the relay coil RY6 remains energized. When the cam 38 has completed its one revolution to return to its initial position in which its portion of an increased diameter bears against the roller $SW_5b$ of the switch $SW_5$ to open this switch through the actuator $SW_5a$, relay coil RY6 is deenergized, whereby its movable contacts $Y6_{a1}$ and $Y6_{b1}$ are switched to engage the normally closed contacts $Y6_{a2}$ and $Y6_{b2}$, respectively, short-circuiting the motor $M_0$ to stop its motion rapidly.

When a proper amount of exposure has been applied to the film surface, the voltage across the capacitor $C_4$ will reach a given level, whereupon the switching circuit operates to cause conduction of the transistors $Q_2$, $Q_3$ and $Q_4$. The conduction of the transistor $Q_4$ permits a current flow through the electromagnet RY4, which therefore is operated to close the shutter blades 33 from their fully open position.

Concurrently with the closure of the shutter blades 33, the switches $SW_2$ and $SW_3$ are closed to re-energize the relay coils RY1 to RY3, thus switching their movable contacts. As a consquence, the lamp $L_2$ is extinguished while the lamp $L_1$ is illuminated. This indicates that the automatic exposure has been properly completed. This completes an automatic exposure photographing operation.

While in the above emodiment, the rocking bar 42 which operates the release member 34 has been used to open and close the switches $SW_2$ and $SW_3$, it is preferred that these switches be operated directly by an opening movement of the shutter blades 33 in order to increase the accuracy of the period during which the lamp $L_2$ is illuminated.

When taking a picture with a changed magnification, the turret (not shown) of the microscope is rotated to interchange the objective lens as is well known. This results in a change in the amount of transmitted light through the lens, with a corresponding change in an exposure period. However, if the change in the exposure period is excessive, a satisfactory photographing operation can not be assured because of a deviation in the film speed which occurs as a result of the reciprocity law failure. For this reason, an excessive amount of change in the exposure period should be avoided, and the photographing should take place with as nearly constant exposure period as possible in order to assure a color reproduction. In this instance, the exposure meter circuit is used to check a proper exposure. Specifically, before interchanging the objective lens, the exposure meter button 31 (see FIG. 1) is depressed to close the operating switch $SW_4$ shown in FIG. 2. When this switch is closed, the relay coil RY5 is energized, with its movable contacts $Y5_{a1}$ to $Y5_{d1}$ switching to the contacts $Y5_{a2}$, $Y5_{b3}$, $Y5_{c3}$ and $Y5_{d3}$, respectively, connecting the meter Me with the photoelectric transducer element $P_1$. This will permit the pointer of the meter to deflect in accordance with the resistance presented by the photoelectric transducer element $P_1$. The deflection of the pointer corresponds to the resistance during a previous photographing operation, assuming that the element $P_1$ is exposed to the same radiation as in an automatic exposure, and this must be memorized. Then the button 31 is released, and the objective lens is interchanged to vary the magnification. Then the pointer of the meter will deflect to a different position, which must be restored to the previous position by an adjustment of the amount of light and by changing filters. This will achieve the same resistance of the photoelectric transducer element $P_1$ as that used in the previous photographing operation, whereby the exposure period will be maintained substantially at the same value. Subsequently, the release button 28 (see FIG. 1) may be depressed to provide an automatic exposure photographing operation in the manner described above.

When a manual exposure is desired, the change-over switches $S_1$ to $S_3$ are turned to their fixed contacts TM. At this time, the input circuit for the switching circuit which comprises switch $S_4$, switch $S_2$, movable contact $Y1_{c1}$, movable contact $Y1_{b1}$ and diode $D_2$ is connected to the ground line as a result of the switching of the switch $S_3$, so that the electronic shutter circuit which includes the time constant circuit and the switching circuit including the FET $Q_2$ will not operate. However, the lamp circuit for displaying the feasibility of an automatic exposure and an automatic exposure period as well as the automatic shutter release circuit will operate in the similar manner as in an automatic exposure operation. Thus, when the shutter is released, the automatic shutter release circuit operates to open the shutter blades 33 (see FIG. 3) to permit an exposure. When the shutter blades are to be closed, the time-out button 29 (see FIG. 1) may be depressed. The depression of the button 29 closes the switch $SW_1$ shown in FIG. 2. The closure of the switch $SW_1$ energizes the electromagnet RY4 which closes the shutter blades 33. In this manner, any desired exposure period can be chosen. It will be understood that such a manual exposure is employed for a prolonged exposure period.

When performing a synchronized photographing operation under a stroboscopic light, the change-over switches $S_1$ to $S_3$ are changed to the fixed contacts X. This results in a connection of the switch $S_2$ with the time constant circuit comprising the fixed resistor $R_{27}$ and the capacitor $C_{12}$, and a disconnection of the time constant circuit comprising the photoelectric transducer element $P_1$ and a group of capacitors which are switched by the rotary switch $S_4$. The fixed resistor $R_{27}$ and the capacitor $C_{12}$ provide a fixed time constant to determine an exposure period during which a stroboscopic flash is activated to effect a synchronized photographing operation.

While the above description deals with the application of the invention to a microscope of the transmission type, it should be understood that the invention can be equally applied to a microscope of the reflection type.

While the invention has been described with reference to a particular embodiment thereof, it should be understood that certain changes and modifications can be made therein without departing from the scope and spirit of the invention as defined by the appended claims.

What is claimed is:

1. Apparatus for specimen photomicrography including a lamp source, focusing optics and a film chamber, said focusing optics being adapted to image a specimen in the film plane of the chamber;
   shutter means for selectively exposing the film in said chamber for an adjustable time interval at least equal to a predetermined value to enable use of a lamp source having an intensity which is insufficient to unduly heat and/or damage a specimen;
   means for sequentially determining the feasibility of obtaining a properly exposed picture of a specimen and for thereafter operating the shutter means to expose the film for a time interval commensurate with a proper exposure comprising:
   a normally deenergized solid state switching circuit having an input and adapted to generate an output when a signal of a predetermined threshold level is applied to its input;
   threshold circuit means;
   photoelectric transducer means positioned in the optical path between said source and said shutter so as to be activated by light from the specimen;
   first and second lamp means;
   settable time delay means for developing a predetermined adjustable signal level after a delay interval associated with the film speed of the film in said chamber;
   means for charging said time delay means with an adjustable charging current having a magnitude which is related to the film speed of the film in said chamber;
   motor means for opening said shutter means;
   normally deenergized means for closing said shutter;
   operable actuable shutter release means for energizing said motor to open said shutter;
   relay means and first switching means responsive to the state of said shutter means to energize said relay means when said shutter means is closed and to deenergize said relay means when said shutter means is open, said relay means having first movable switch means for coupling said transducer means between said charging means and the input of said threshold circuit means and for coupling the input of said solid state switching means to the output of said threshold means and said first lamp means to the output of said solid state switching means whereby said threshold circuit means develops an output at least equal to said threshold level when said transducer means is illuminated by light of a sufficient level to cause said solid state switching means to light said first lamp means to indicate the feasibility of a proper exposure;
   said relay means including second movable switch means responsive to deenergization of said relay means for coupling said transducer means between said adjustable time delay means and the input of said solid state switching means and for coupling the output of said solid state switching means to said shutter closing means whereby said shutter closing means is energized to close said shutter means after said predetermined time delay;
   said relay means including additional movable switching means responsive to deenergization of said relay means for illuminating said second lamp means and for decoupling said first lamp means from said solid state switching circuit to assure that said first lamp means is energized only during a feasibility testing interval and said second lamp means may be energized only during a film exposing interval.

2. The apparatus of claim 1, wherein said shutter means comprises rotatable means movable through a predetermined angle and being coupled to said motor means and operated in a reciprocating fashion so as to move from a first position to a second position, said rotatable means including means for imparting a rotating opening force to said shutter means as opposed to imparting a linear opening force to thereby prevent oscillations to said microscope apparatus which might have a harmful effect on the photographing operation.

3. The apparatus of claim 2, wherein said motor means comprises a motor having an output shaft rotatable upon energization of the motor;
   cam means coupled to said output shaft;
   said opening means comprising an arm pivotally mounted intermediate its ends and having a first end engaging said cam;
   means engaging the second end of said arm for imparting the rotating movement to said shutter means.

4. The apparatus of claim 2 wherein said relay means comprises first and second relays;
   said first switching means including a first switch adapted to energize said first relay means when said opening means initiates movement from said first position to said second position; and
   second switch means for energizing said second relay means when said opening means has substantially moved to said second position;
   said first relay being adapted to provide the circuit connections to test for photographing feasibility when energized and to provide the circuit connections to permit a photographing operation when deenergized;
   said second relay being adapted to deenergize said second lamp means and couple said first lamp means to said solid state switching means when in the deenergized state and to energize said second lamp means and to decouple said first lamp means from said solid state switching means when said second relay means is in said energized state.

5. The apparatus of claim 1, wherein the transducer element comprises a CdS member which varies its resistance with the intensity of light from the specimen.

6. The apparatus of claim 1, wherein said time delay means comprises a plurality of capacitors whose values correspond to values of film speed and switching means for selectively coupling one of said capacitors to said transducer means in accordance with the film speed of the film being used.

7. Photomicrographic apparatus for filming specimens including:
   shutter means selectively operable for exposing film to a specimen;
   means for moving said shutter from the closed position to an open position;
   an automatic exposure control means for selectively providing either an indication of the feasibility of a proper exposure or for controlling the length of an exposure comprising:
   first and second normally energized relays;
   means operated by said shutter means to deenergize said first relay when said shutter means begins to open and for deenergizing said second relay when said shutter means is substantially fully open;
   a photoelectric transducer element being activated by light from the specimen to be photographed;
   an a.c. signal source;
   first means for converting said a.c. signal source into a d.c. level;
   threshold circuit means including second means for converting the signal applied thereto to a d.c. level;
   a time delay circuit means;
   first and second lamps;
   a solid state switching circuit;
   said first relay means having a first group of contact means being responsive to energization of said first relay means for coupling said transducer element between said signal source and said second converting means and responsive to deenergization of said first relay means for coupling said transducer element between said first converting means and said time delay circuit means and for coupling said time delay circuit means to said solid state switching means;
   said second relay including a first group of contact means responsive to energization of said second relay for coupling said first lamp to said switching circuit means and decoupling said second lamp from said first converting means and being responsive to deenergization of said second relay for coupling said second lamp to said first converting means and decoupling said first lamp from said solid state switching means, whereby illumination of said first lamp indicates the feasibility of a proper film exposure when the voltage level developed by said threshold circuit means is sufficient to activate said solid state switching means and illuminate said first lamp and whereby said first lamp is extinguished and said second lamp is illuminated to indicate the initiation of an exposure cycle.

8. The apparatus of claim 7, further comprising electromagnetic means for closing said shutter means;
   said first relay including second contact means for coupling said electromagnetic means to said solid state switching means only when said first relay is energized whereby said electromagnetic means is energized by said solid state switching circuit means after a time interval determined by said time delay means and said transducer means to close the shutter means only after a proper exposure period has occurred.

9. The apparatus of claim 7, wherein said means for moving said shutter means to the open position comprises motor means and swingable means reciprocating from a first position to a second position and returning to said first position during one revolution of said motor means for imparting a rotating opening force to said shutter means.

10. The apparatus of claim 9, further comprising switch means responsive to the completion of one revolution of said motor means to halt said motor means.

11. The device of claim 7, further comprising a third relay;
   meter means; color temperature sensing means normally coupled to said meter means whereby said meter means normally provides a color temperature reading; and means for energizing said third relay wherein said third relay includes means for coupling said transducer element to said meter means upon energization of said third relay to provide a visually observable reading of the light intensity detected by said transducer element.

* * * * *